United States Patent [19]

Khan et al.

[11] Patent Number: 5,764,001

[45] Date of Patent: Jun. 9, 1998

[54] PLASMA ADDRESSED LIQUID CRYSTAL DISPLAY ASSEMBLED FROM BONDED ELEMENTS

[75] Inventors: Babar Ali Khan, Ossining, N.Y.; Henri R. J. R. Van Helleputte, Eindhoven, Netherlands; Adrianus L. J. Burgmans, Eindhoven, Netherlands; Petrus F. G. Bongaerts, Waalre, Netherlands; Karel Elbert Kuijk, Dommelen, Netherlands; Jacob Bruinink, Eindhoven, Netherlands

[73] Assignee: Philips Electronics North America Corporation, New York, N.Y.

[21] Appl. No.: 573,742

[22] Filed: Dec. 18, 1995

[51] Int. Cl.[6] .................................... G09F 9/35
[52] U.S. Cl. ............................ 313/582; 313/583
[58] Field of Search .................... 313/581, 582, 313/583, 584, 585, 586, 634; 349/32; 220/2.1 R

[56] References Cited

U.S. PATENT DOCUMENTS

| | | |
|---|---|---|
| 5,377,029 | 12/1994 | Lee et al. ............................ 349/32 |
| 5,499,122 | 3/1996 | Yano .................................. 349/32 |
| 5,525,862 | 6/1996 | Miyazaki ............................ 313/582 |
| 5,596,431 | 1/1997 | Bongaerts et al. ............... 313/484 X |

*Primary Examiner*—Nimeshkumar Patel
*Attorney, Agent, or Firm*—John C. Fox

[57] ABSTRACT

A flat display device, preferably of the PALC type, in which the plasma channels are formed by etching in a substrate laterally-spaced channels and bonding a thin dielectric sheet over the etched substrate. Adjoining each of the channels are shallow ledges, also formed by etching, which serve as recessed areas to receive enlarged ends serving as contact pads for each of the electrodes. Holes are formed in the thin dielectric sheet and contact material deposited on the bonded thin dielectric sheet such that the deposited material makes electrical contact with the underlying electrode contact pads and seals off the holes, which allows a plasma-forming atmosphere to be provided in the channels. This arrangement results in a glass-to-glass interface between the substrate and the thin dielectric sheet, which allows anodic bonding to be employed to assemble the two elements and thus eliminates the frit glass sealing process required in other constructions.

7 Claims, 4 Drawing Sheets

PLASMA ADDRESSED LIQUID CRYSTAL DISPLAY ASSEMBLED FROM BONDED ELEMENTS

RELATED APPLICATIONS

1) Application, Ser. No. 08/384,090, filed Feb. 6, 1995
2) Application, Ser. No. 08/413,052, filed Mar. 29, 1995, now U.S. Pat. No. 5,596,431
3) Application, Ser. No. 08/588,800, filed Jan. 19, 1996

BACKGROUND OF INVENTION

This invention relates to plasma channels, to display devices comprising plasma channels, and to plasma-addressed liquid crystal display panels commonly referred to as "PALC" display devices using such channels. PALC devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns and each of which is filled with a low pressure ionizable gas, such as helium, neon and/or argon, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of the backlight or incident light to each LC pixel is a function of the stored voltage across the pixel. A more detailed description is unnecessary because the construction, fabrication, and operation of such PALC devices have been described in detail in the following U.S. patents and publication, the contents of which are hereby incorporated by reference: Buzak et al., "A 16-Inch Full Color Plasma Addressed Liquid Crystal Display", Digest of Tech. Papers, 1993 SID Int. Symp., Soc. for Info. Displ. pp. 883–886.

A partial perspective view of the PALC display described in the 1993 SID Digest is shown in FIG. 2. The method described in the referenced publication for making the plasma channels is to chemically etch a flat glass substrate to form parallel semi-cylindrically shaped recesses defined by spaced ridges or mesas and to bond on top of the mesas a thin dielectric cover sheet having a thickness in the range of about 30–50 μm. The bonding is typically carried out using a glass frit sealing process.

The above construction and its fabrication encounters certain problems as a consequence of use of the glass frit sealing process. These involve the presence of loose particles and contamination which detrimentally affects performance of the display.

SUMMARY OF INVENTION

An object of the invention is an improved channel plate.

A further object of the invention is an improved plasma-addressed display device.

Another object of the invention is an improved method for fabricating the plasma channels of a PALC display device.

Still a further object of the invention is an improved method for fabricating the plasma channels of a PALC display device which avoids the use of a frit sealing process.

In accordance with a first aspect of the invention, a channel plate comprises a dielectric substrate and a thin dielectric sheet-like member arranged over and spaced from the substrate by a plurality of laterally spaced ridges or mesas formed in a major surface of the substrate and defining a plurality of elongated spaced channels. At at least one end of each of the channels, at the same major surface, are formed shallow recessed areas. The recessed areas serve to receive and locate the enlarged ends which serve as contact pads of spaced electrodes provided in each channel. Because the enlarged electrode ends lie below the major surface, glass frit sealing is no longer needed to bond the thin dielectric sheet over the substrate to close off the channels. Preferably a direct glass-to-glass bonding process is employed, such as the anodic bonding process described in the first referenced related application, whose contents are incorporated herein.

Preferably, the channels are formed in the substrate by an etching process, and the recessed areas are formed adjacent to opposite channel ends and along the longitudinal axis of each channel. Connections to the control pads at the electrode ends are preferably made by way of vias formed in the thin dielectric sheet. The desired channel configurations, typically elongated parallel channels, are preferably straight but also may be curved while still maintaining a substantially parallel relationship. The height of the mesas determines the height of the channels, which are each formed by the portion of the substrate surface extending between adjacent flanking mesas, the flanking mesas themselves forming the channel walls, and the overlying portion of the thin dielectric sheet-like member. The assembled device incorporates a plasma-forming atmosphere.

It is known that glass can be anodically bonded to silicon using heat and an electric field to cause mobile ions in the contacting materials to migrate to the sheet interfaces and bond them together.

In accordance with a second aspect of the invention, the contacts to the contact pads are formed by deposition of metal on the thin dielectric cover sheet, with the result that the vias are sealed by the deposited metal to close off the channels while at the same time completing the contacts to the contact pads.

In accordance with a preferred embodiment of the invention, the channel plate is part of a PALC display device, and the combination of the substrate and the overlying thin dielectric sheet-like member, together with the electrodes, constitutes the plasma channels or channel plate of the PALC display device.

The various features of novelty which characterize the invention are pointed out with particularity in the claims annexed to and forming a part of this disclosure. For a better understanding of the invention, its operating advantages and specific objects attained by its use, reference should be made to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
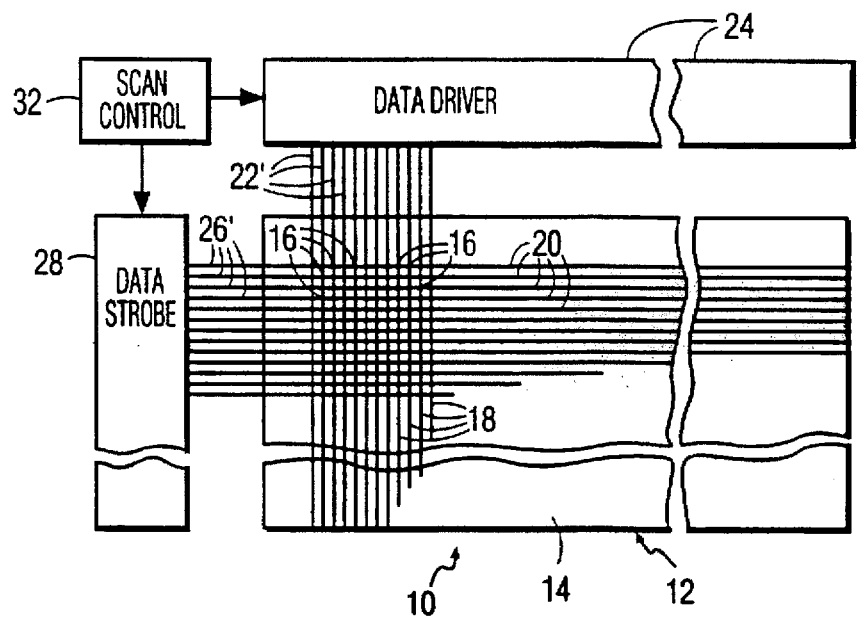
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34 (FIG. 2), and the channel rows are usually built into a second transparent substrate 36. Skilled persons will appreciate that certain systems, such as a reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion as had been described. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
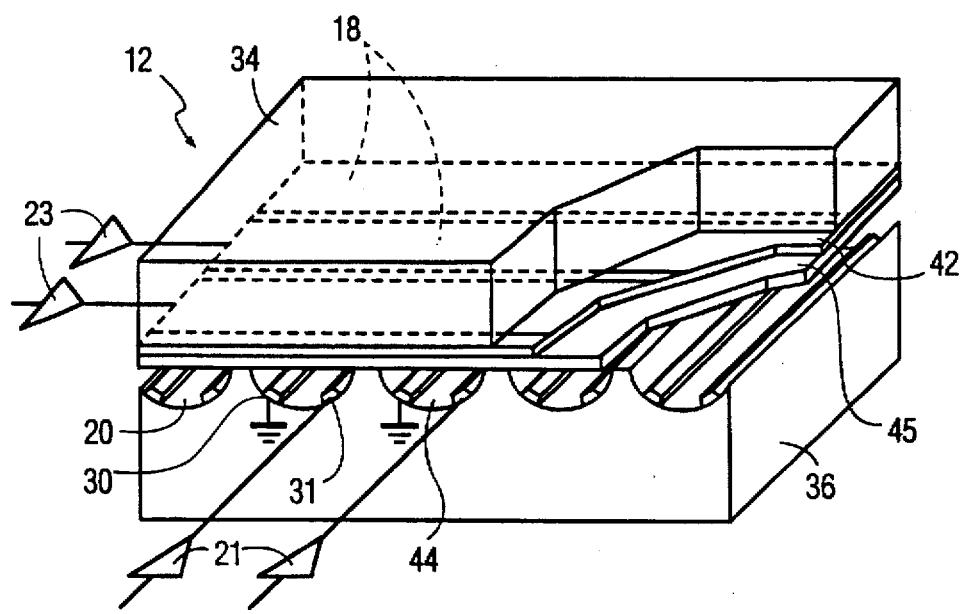
FIG. 2 is a perspective view of part of a conventional PALC display device.
Figure 3A:
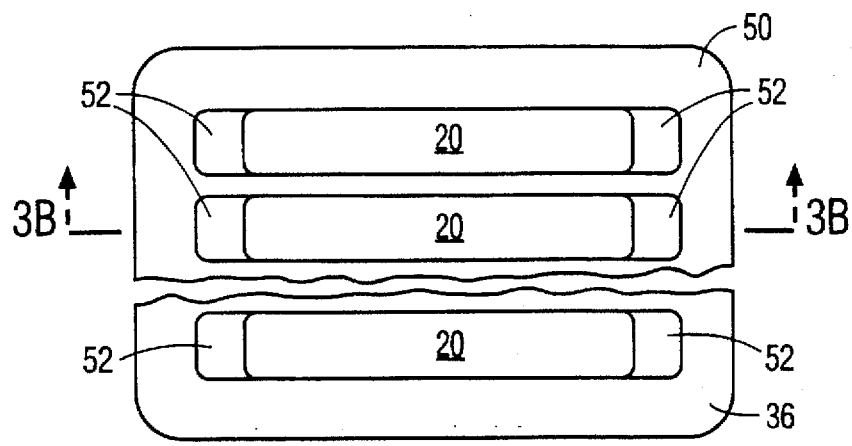
FIGS. 3A,3b,4A,4B,5A,5B,6A,6B,7A, and 7B illustrate the sequence of steps of one method in accordance with the invention for fabricating one form of a channel plate according to the invention for use in a PALC color display. In this sequence of figures, in each instance, the A and B figures for each of the numbered figures are partial top and cross-sectional views along the line labelled B-B, respectively, showing the channel plate construction at each step of the process.
Figure 3B:
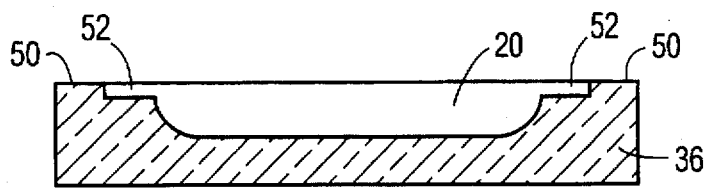
Figure 4A:
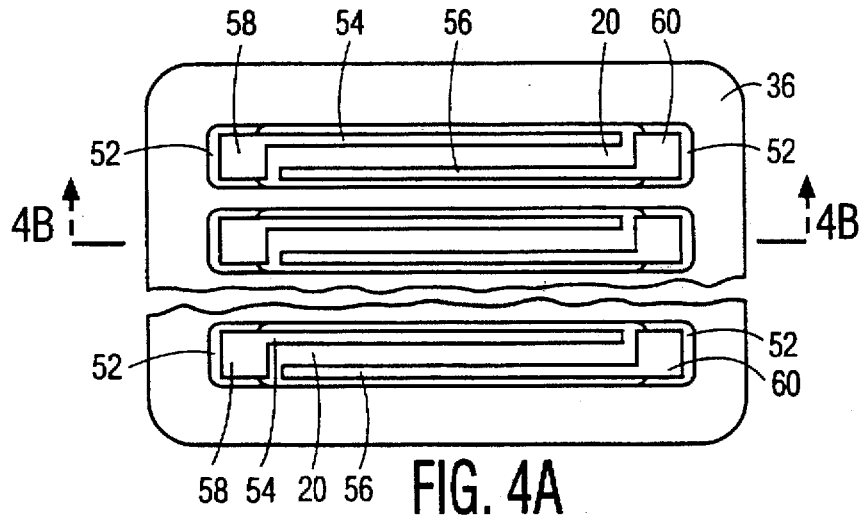
Figure 4B:
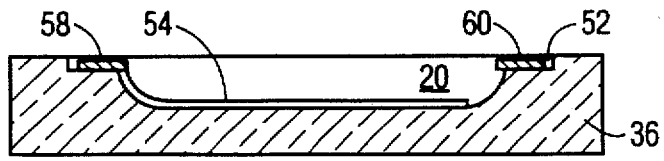

FIG. 2 illustrates the PALC version of such a flat display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the anode. The second electrode 31 is called the cathode, because to it will be supplied relative to the anode electrode a negative strobe pulse sufficient to cause electrons to be emitted from the cathode 31 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

Fabrication of a PALC device is typically done as described in the 1993 SID digest paper by providing first and second substrates 34, 36 with the first substrate 34 comprising a glass panel on which is vapor-deposited the ITO column electrodes 18, followed by color filter processing over the ITO electrodes to produce the RGB stripes (not shown), followed by the black surround processing and liquid crystal alignment processing. The second substrate 36, also a glass panel, is masked and etched to form the channels 20, following which the plasma electrode material is deposited and masked and etched to form the cathode 31 and anode 30 electrodes. A thin dielectric glass microsheet 45 is then sealed across the peripheral edges of the device to form with the ridges 50 the channels 20, which are then exhausted, back-filled with a low-pressure ionizable gas such as helium and/or neon and optionally with a small percentage of argon and sealed off. LC alignment of the exposed surface of the microsheet 45 is then carried out. The two assembled substrates are then assembled into a panel with the two LC alignment surfaces spaced apart and facing, the LC material 42 introduced into the space, and electrical connections made to the column electrodes 18 and plasma electrodes 30, 31.

FIGS. 3A-7B are top and cross-sectional views of different steps in the fabrication of one form of channel plate in accordance with the invention for one form of liquid crystal display panel in accordance with the invention. A thick flat glass bottom plate 36 forms a substantially transparent dielectric substrate for the plasma channels 20. The first step is the etching of the elongated channels 20 from a major surface 50 of the substrate. Only three channels are shown but it will be appreciated that a typical PALC display device contains several hundred channels. Also, the length of each channel (horizontal dimension in the figures) typically equals the length of one row of the display. The channels 20 can be formed in any of several well known processes. Typically this is done by etching trenches in the substrate glass 36 using standard masking and etching techniques, several of which are described in the referenced patents and publications. For example, a chromium masking layer on the substrate surface 50 can be used as the glass etchant mask, and the chromium mask can in turn be patterned using a negative resist as a mask for the chromium etchant. The depth of the etched trenches 20 is substantially equal to the depth of the required plasma channels, for example 150 microns. After the channels 20 have been etched, the masking layer (not shown) is then patterned again to provide at the end of each channel additional openings preferably aligned with the longitudinal axis of the associated channel. The substrate 36 is then etched further but only to a depth of a few microns, to form shallow recessed areas or ledges 52 connected to and adjoining each channel end. The figures are not to scale. The depth of the ledges 52 need be only sufficient to accommodate the thickness of an enlarged contact end of each of the channel electrodes to be provided. The masking layer is then removed to leave the configuration illustrated in FIGS. 3A and 3B, The electrode material can then be deposited and patterned in the standard way, except that each electrode 54, 56 terminates, respectively, in an enlarged contact pad 58, 60 each of which is located almost entirely in the ledge 52 at opposite channel ends. As will be appreciated by those skilled in this art, the cathode and anode electrodes, of which one is provided in each channel, typically terminate in contact pads at opposite channel plate edges, so that the required potentials can be more easily applied to the electrodes in the completed device during operation. Thus all cathode electrodes 54 would typically terminate, say, at the 5 left edge, and all anode electrodes 56 at the right edge of the plate. For clarity, the electrodes 54, 56 are shown stippled in the top views and hatched in the cross-sectional views. The plate at this stage is illustrated in FIGS. 4A and 4B.

Figure 5A:
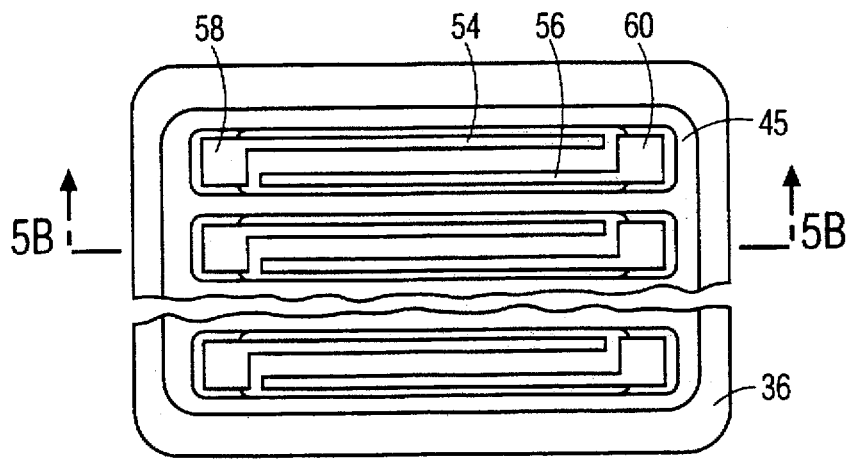
Figure 5B:
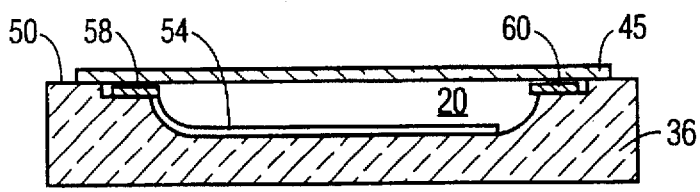

The next step is to bond the thin dielectric sheet 45 over the 10 substrate 36 to close off the channels 20. Preferably, anodic bonding is used, which can be applied to any two bodies having surfaces containing ions that can become mobile at elevated temperatures. In a typical anodic bonding process, the thin dielectric sheet 45, typically of glass, is placed over and in contact with the major surface 50 of the typical glass substrate 36, the two are pressed together, and an electric field is applied across them while the assembly is heated to an elevated temperature. Ions migrate to the interface between the two sheets and pull them together. The resulting force, in the presence of 20 the heat, leads to the formation of a permanent bond between the two sheets. Typical elevated temperatures are much lower than the softening point of the glass. The assembly at this stage is illustrated in FIGS. 5A and 5B.

Figure 6A:
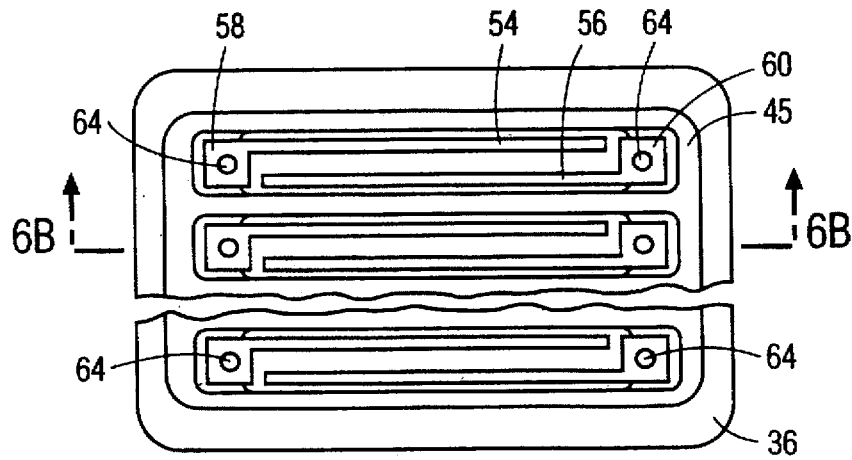
Figure 6B:
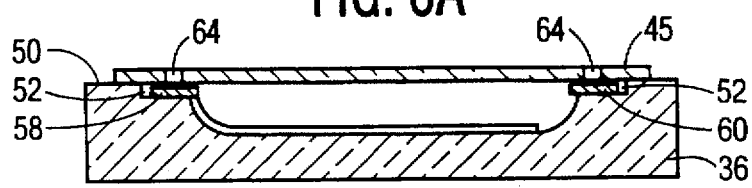

After the bonding step, contact holes or vias 64 are then 25 etched through the thin dielectric sheet 45, in the ledge area, over the contact pads 58, 60, as illustrated in FIGS. 6A and 6B., preferably using vapor phase etching, such as reactive ion etching.

Figure 7A:
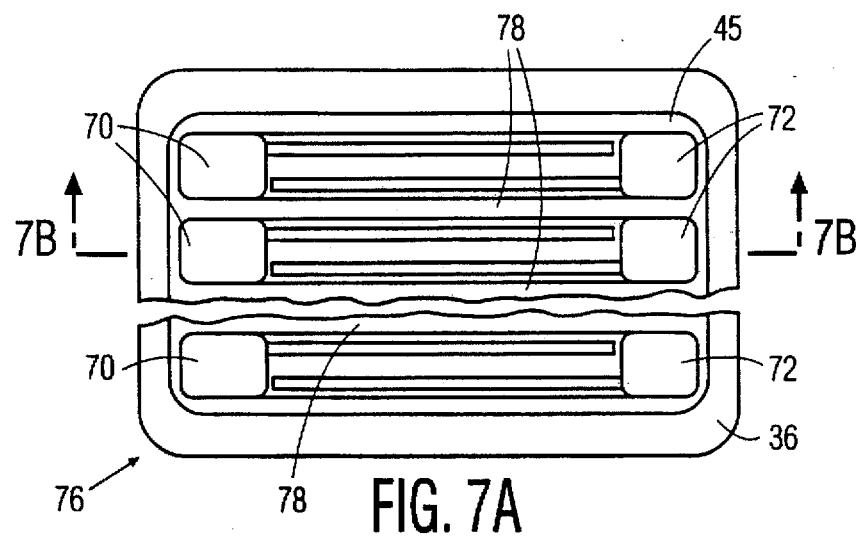
Figure 7B:
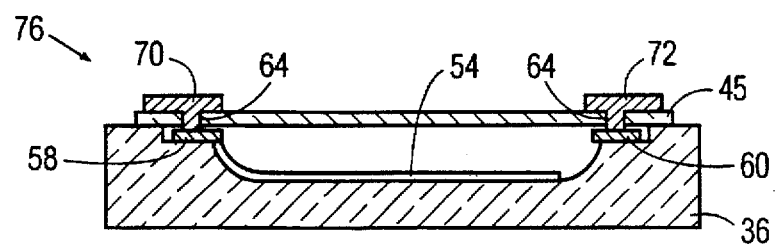

Finally, as shown in FIGS. 7A and 7B, contact metal is then deposited over the top of the thin dielectric sheet 45 using 30 conventional evaporation or sputtering techniques. The contact metal chosen preferably has good adhesion to glass, for example, Ti or Ti/W. The contact metal is then patterned using conventional masking and etching techniques to form the desired metal pattern to the outside world for ultimately receiving the desired cathode and anode potentials. The deposited contact material, referenced 70, 72 for the corresponding contact pads 58, 60, seals the contact holes 64 while making contact to the underlying pads. The resultant glass plate 76 can then be pumped and filled from the back of the substrate panel with the desired plasma-forming atmosphere in the usual way by attaching a fill tube.

As an alternative procedure, it is possible to eliminate the fill tube and filling and sealing procedure. This can be accomplished by carrying out the evaporation or sputtering of the contact metal to form the external contacts 70, 72 in the very same plasma-forming gas ambient which is to be used to fill the channels. For example, the sputtering or evaporation can be carried out in a gas atmosphere of, for example, He or He/Ar, at the same pressure of the final plasma-forming atmosphere. Thus, at the conclusion of the metal deposition, which seals the vias 64, the proper gas ambient will be sealed in situ in the channels. Therefore, the separate fill tube attachment, filling and sealing procedures can be avoided.

The height of the channel sidewalls 78 produced during etching of the channels, it will be appreciated, represents the height of the channels 20 and constitute the spacers that space the thin dielectric sheet 45 that closes off the channels from the substrate 36.

In addition to etching by conventional chemical etchants or by conventional plasma etching, alternatively, a mechanical erosion process can be substituted, such as sandblasting.

As will be observed, because glass surfaces are directly in contact with each other, or ion-containing layers on their facing surfaces, the two sheets 36, 45 can be anodically bonded to each other thereby avoiding the frit sealing process. It will also be appreciated that the electrodes 54, 56 must be deposited on the substrate 36 before the thin dielectric sheet 45 has been bonded to it.

The resultant assembled channel plate structure 76 is shown in FIGS. 7A and 7B. The remainder of the PALC panel can be fabricated in the usual way by forming the LC part of the panel on top of the thin glass sheet 45 as shown in FIG. 2.

The term "deposited" as used herein means a layer formed by a vapor-deposition process from a gas or vapor with or without an involved chemical reaction, or by a sputtering or evaporation process.

The broken lines at the edges of the elements in the figures indicate that what is shown is a small section broken off from a larger assembly, since, as will be appreciated, typically a PALC display device for monitor use would contain several hundred column electrodes 18 and several hundred plasma channels 20.

The materials for the electrodes 54, 56 are typically of a metal such as copper, or layers of Cu—Cr—Cu, or other suitable metals.

All of the methods described in the referenced related applications and publication, which are herewith incorporated by reference, will be suitable for making the remaining parts of the panel of the invention.

The invention is generally applicable to all kinds of flat displays, and in particular to displays of the plasma-addressed type, especially PALC displays that typically have a small channel pitch for use in computer monitors, workstations or TV applications. While the main application of the channel plate of the invention is in PALC type display devices, the same plasma plate construction 76 can also be used as a plasma display device where the output is the light, generated by the plasma, which can exit the device via the transparent substrate and/or the overlying transparent sheet-like member.

Several preferred examples for the FIG. 7 embodiment are (all values are in µm): a wall 78 width of about 20–50; a wall height of about 50–160; and a wall pitch of about 200–500.

It will be appreciated that the drawing figures are not to scale and in particular the channel widths have been exaggerated to show the electrodes.

Still further, while the channels in the substrate are typically straight, the invention is not limited to such a configuration and other channel shapes, such as a meandering shape, are also possible within the scope of the invention.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A channel plate for a flat display comprising elongated channels on a dielectric substrate and electrode surfaces in each of the channels, channel-defining flanking wall portions on the substrate, and a thin dielectric sheet-like member over the flanking wall portions and closing off the channels, characterized in that:

a) the substrate comprises, adjoining each of the channels, at least one recessed area, b) a portion of an electrode associated with each channel extends into the adjoining recessed area, c) electrical contact material extends through the thin dielectric sheet-like member into contact with the portion of the electrode extending into the recessed area.

2. A channel plate as claimed in claim 1, wherein the said electrode portion forms a widened contact pad.

3. A channel plate as claimed in claim 1, wherein the substrate has an ion-containing surface facing an ion-containing surface on the thin dielectric sheet-like member and the facing ion-containing surfaces directly contact one another.

4. A channel plate as claimed in claim 3, wherein the thin dielectric sheet-like member and the substrate are constituted of glass and are anodically bonded together.

5. A channel plate for a flat display comprising elongated channels on a dielectric substrate and spaced electrode surfaces in each of the channels, said dielectric substrate comprising channel-defining flanking wall portions on the substrate with a thin dielectric sheet-like member over the flanking wall portions, characterized in that:

a) the substrate comprises, adjoining opposite ends of each of the channels, a recessed area, b) a portion of each of the electrodes associated with each channel extends into one of the adjoining recessed areas to form a contact pad, c) electrical contact material forms, on the thin dielectric sheet-like member, spaced deposits that extend through in sealing engagement with the thin dielectric sheet-like member into contact with the contact pads in the recessed areas.

6. A channel plate as claimed in claim 5, wherein the dielectric sheet and substrate are constituted of glass anodically bonded together.

7. A plasma channel plate for use in a PALC display device comprising elongated channels having electrodes and filled with a plasma-forming atmosphere on a substantially transparent dielectric substrate having an ion-containing surface, characterized in that:

a) on the substrate is a plurality of etched channels each containing deposited spaced electrically conductive electrode layer portions, b) each of the channels terminate, at opposite ends, in shallow ledges into which electrode layer portions extend to form contact pads, c) the channels are closed off by a thin dielectric sheet-like member bonded directly to the substrate, d) contact material is deposited on the thin dielectric sheet-like member and extends through apertures in the latter and makes contact with the contact pads and seals off the apertures, e) a plasma-forming atmosphere fills each of the channels.

* * * * *